US006337775B1

United States Patent
Wilson

(10) Patent No.: US 6,337,775 B1
(45) Date of Patent: Jan. 8, 2002

(54) COLLET LENS MOUNT

(75) Inventor: Clark Wilson, Clackamas, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 09/607,181

(22) Filed: Jun. 29, 2000

(51) Int. Cl.$^7$ .......................... G02B 7/02; G02B 15/14
(52) U.S. Cl. ...................................... 359/819; 359/702
(58) Field of Search ................................. 359/819, 822, 359/823, 825, 826, 827, 702

(56) References Cited

U.S. PATENT DOCUMENTS 6,196,755 B1 * 3/2001 Okorocha et al. ........... 403/313
6,227,672 B1 * 5/2001 Bortz .......................... 353/96

FOREIGN PATENT DOCUMENTS

JP          2001-83387      *  3/2001     .... G02B/7/02 ....

* cited by examiner

Primary Examiner—Georgia Epps
Assistant Examiner—Saeed Seyrafi
(74) Attorney, Agent, or Firm—Stoel Rives LLP

(57) ABSTRACT

A mounting connection for a projection lens barrel in an image projection system is provided that includes a housing having an integral mounting portion for the projection lens barrel. The mounting portion has integral guide members formed thereon that cooperate with helical guide slots formed in an end of the projection lens barrel. A collet located between the projection lens barrel and the housing mounting portion is movable between a first position in which the collet frictionally engages the mounting portion to hold the projection lens barrel held stationary and a second position in which the collet is free of engagement with the mounting portion so that the projection lens barrel is free to be rotated to advance and retract to an adjusted position.

9 Claims, 4 Drawing Sheets

COLLET LENS MOUNT

TECHNICAL FIELD

This invention relates to projection systems and, in particular, to a mounting arrangement for a lens barrel onto a projector housing.

BACKGROUND OF THE INVENTION

Projection systems use a lens or system of lenses to project an image from an image source onto a viewing screen. Light emitted by the image source or by another source separate from the image source is collected and projected onto the viewing screen. The light is concentrated into a projecting lens housed within a lens barrel mounted on the projector housing and projected onto the viewing screen. When viewing an image projected onto a screen it is sometimes necessary to manipulate the zoom lens to change the projected image from a larger image to a smaller image. Such zooming usually requires an adjustment to focus the image. Typically, this is done by rotating the projection lens barrel to move the lens elements back and forth within the lens barrel in a direction parallel to the optical axis. However, image projectors are often used for business meetings or other presentations that might often require changing the image size and it is inconvenient and/or time consuming to constantly re-focus the image.

In order to overcome the problem of having to re-focus the image after zooming some image projectors have a projection lens that has been compensated to allow a change in image size without having to re-focus the image. The compensation is done during the manufacture of the image projector by rotating the zoom lens to one extreme position in which the image is as large as it can get. The large image is then focused by rotating the projection lens barrel to move the lens elements internally. The zoom lens is then rotated to an extreme opposite position in which the image is as small as possible. The small image is then focused by moving the entire projection lens barrel either toward or away from the active element, such as, for example, a projection screen. The projection lens barrel is then locked in place and the lens compensation is complete.

Currently, image projectors with a compensated lens system employ various types of components to lock the projector lens barrel in place after compensation has been completed. For example, such projectors may include a projector lens barrel connected to the projector housing by screw threads with the lens barrel is locked in place by set screws. The set screws extend through threaded holes in the lens barrel and the projector housing. In order to compensate the projector lens the set screws must first be loosened and the projection lens barrel rotated about the screw threads in a direction substantially parallel to a focal axis to focus the image. After the lens has been compensated the projection lens barrel is then locked in place by tightening the set screws. Securing the lens barrel in place in this manner requires the user to hold the projection lens barrel in place while tightening the set screws. This can be awkward and may result in inadvertent movement of the projection lens barrel causing the lens to be less than optimally compensated. Furthermore, such systems require difficult manufacturing steps, such as, for example, machining small threaded holes for the set screws. Other image projectors may use other types of components such as, for example, shims to lock the projection lens in place after it has been compensated. However, the use of shims and other similar components are similarly awkward.

SUMMARY OF THE INVENTION

The present invention overcomes the above-described problems by providing a mounting for a projection lens barrel onto a projector housing that allows the user to more easily and accurately adjust and lock the projection lens barrel compensate the lenses. This is accomplished by mounting the projection lens barrel onto the projector housing with guide pins that cooperate with guide slots in the projector housing. The guide pins follow along the guide slots to advance or retract the projection lens barrel along an axis as the projection lens barrel is rotated to allow a more controlled and quick compensation operation. A spring actuated collet locks the projection lens barrel in place.

The projector housing generally includes a one-piece casting with an integrally formed projection lens barrel mounting portion. The barrel mounting portion includes guide pins that may be formed in a variety of shapes and configurations that are integral with the barrel mounting portion. Alternatively, the guide pins may formed separately and later press fit or otherwise secured to the barrel mounting portion. The projection lens barrel is formed with guide slots that cooperate with the guide pins so that the projection lens barrel can easily be rotated to advance and retract the projection lens barrel to focus a projected image. Once the projected image is focused the projection lens barrel is locked in place by a spring actuated collet.

The present invention eliminates the use of screw threads, set screws, shims and other similar components to lock the projection lens barrel in position.

It is an object of the invention to provide a mounting system for a projection lens barrel on an image projector housing that provides a more accurate and easy adjustment of the projection lens barrel to compensate the lens.

Another object of the present invention to provide quick and easy arrangement to lock the projection lens barrel in an adjusted position.

Still another object of the present invention is to provide a spring actuated collet to lock the projection lens barrel in the adjusted position.

A further object of the invention is to provide a projection lens barrel mounting system that eliminates screw thread connections, reduces the number of parts and is easier to manufacture.

Yet another object of the invention is to provide a projections lens barrel mounting system in which compensation of the projection lens is convenient and simple.

Additional objects and advantages of this invention will be apparent from the following detailed description of preferred embodiments thereof which proceeds with reference to the accompanying drawings.

DETAILED DESCRIPTION OF PREFERRED EMBODIMENT

Figure 1:
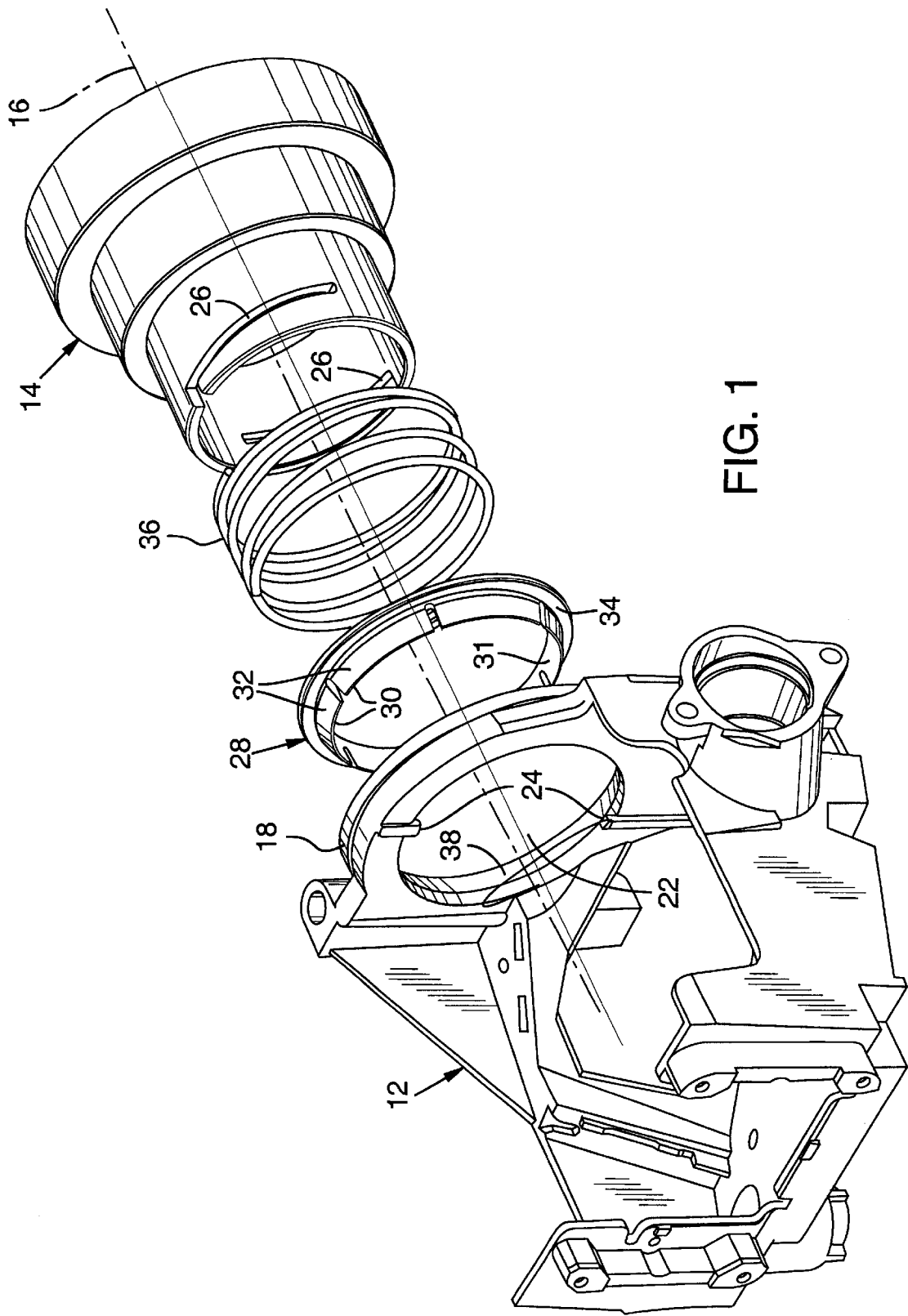
FIG. 1 is an exploded isometric view of the projection lens barrel collet mount for a projector housing.
Figure 2:
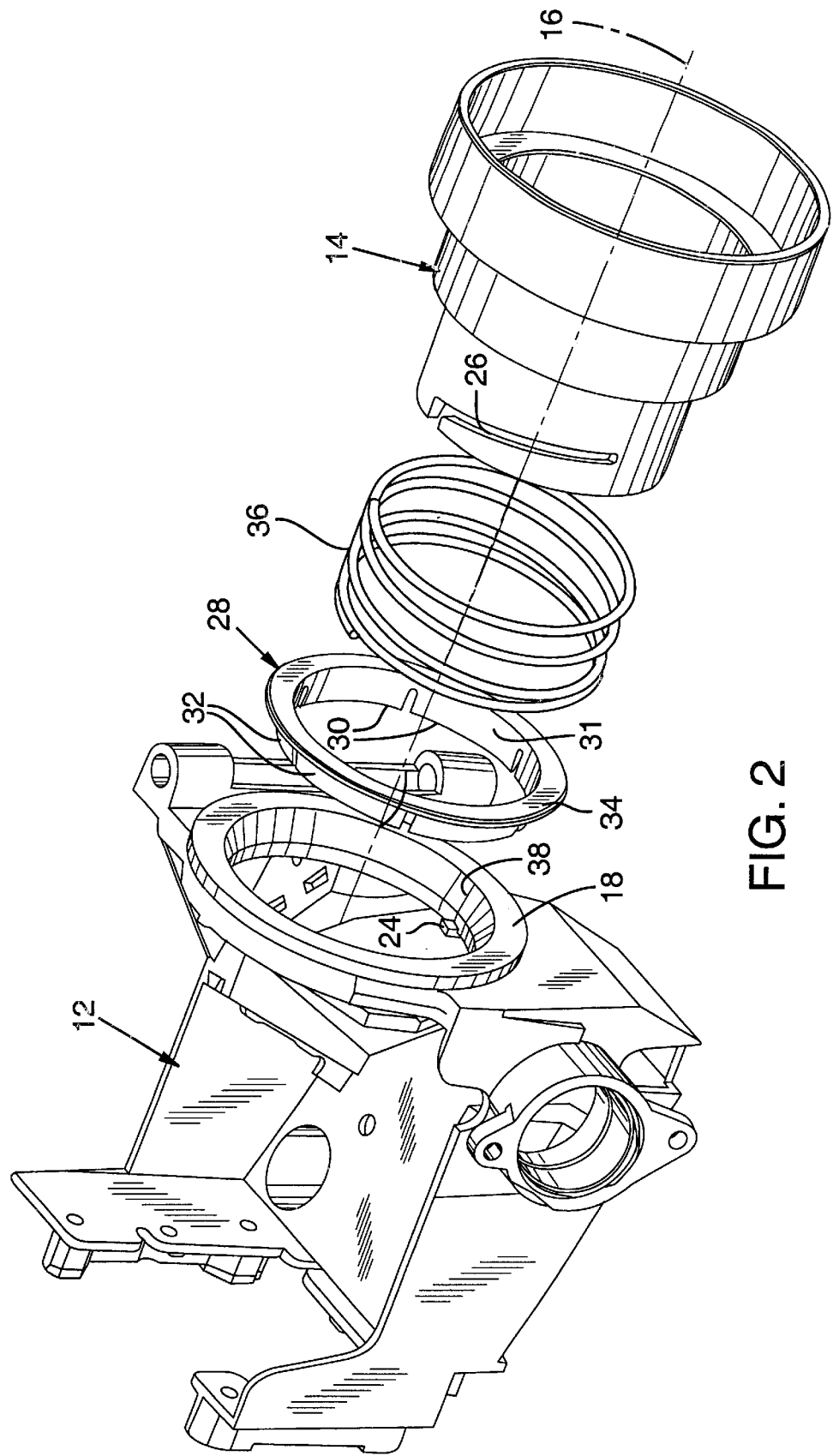
FIG. 2 is another exploded isometric view of the projection lens barrel collet mount of the present invention.
Figure 3:
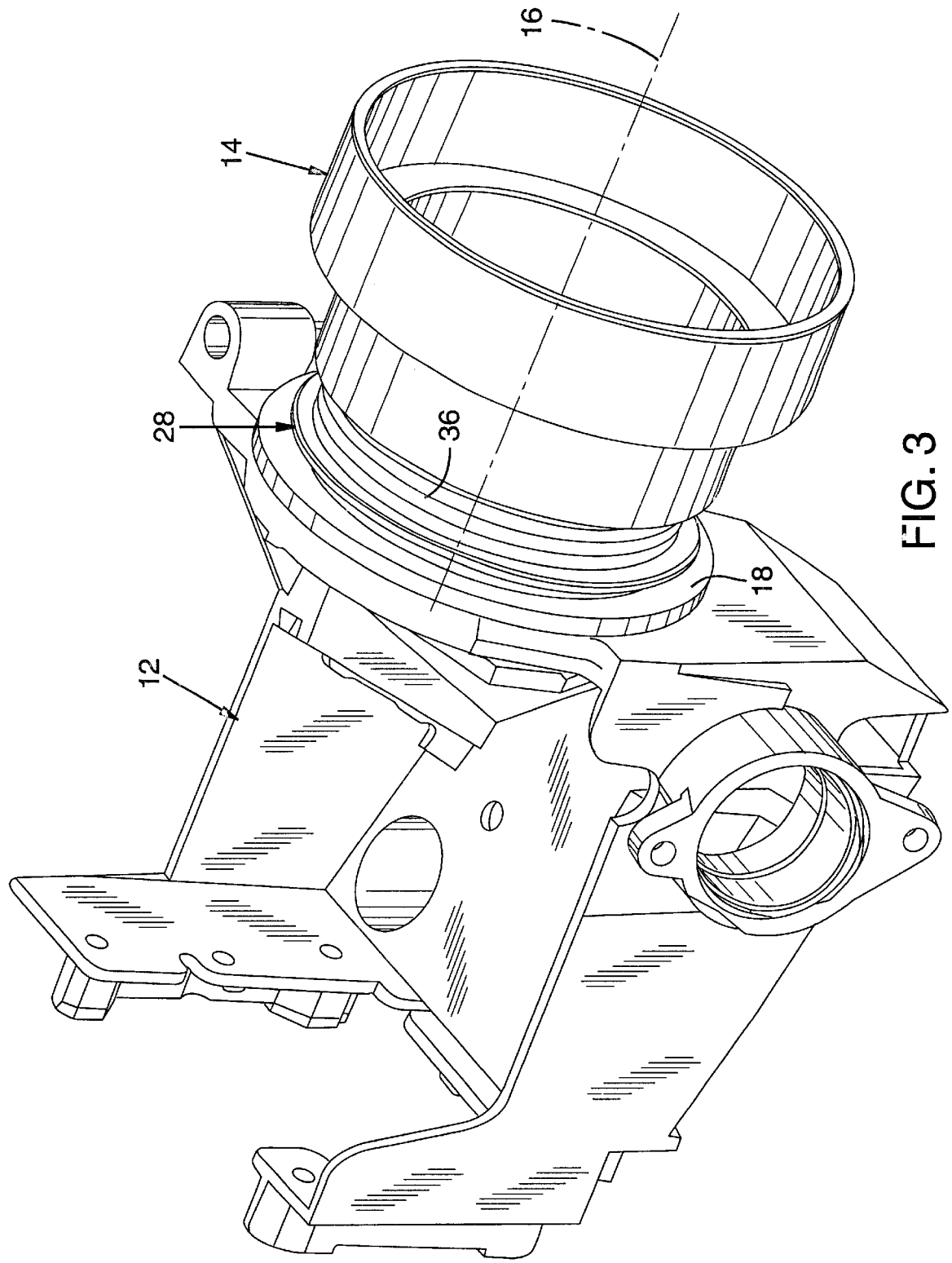
FIG. 3 is an isometric view of the projection lens barrel collet mount shown assembled.

A variety of projection systems are used to project an image from an image source onto a screen for presentations at business meetings, sales demonstrations, and classroom sessions. FIGS. 1–3 show elements of an image projector including a housing 12 to contain the various projection components and a projection lens barrel 14 containing a lens or lens elements (not shown) through which light travels along a focal axis 16 to project the image onto the screen. There are times when it may be necessary to enlarge or reduce the image. In order to change the size of the image the zoom lens is rotated to move one lens or a group of lenses within the projection lens barrel along the focal axis 16; however, the position of the projection lens barrel 14 within the housing 12 does not change.

The housing 12 is preferably a one piece casting or molding and the projection lens barrel 14 is connected to the housing 12 through a barrel mounting portion 18 formed in the housing 12. The barrel mounting portion 18 includes an opening 22 to receive and hold the projection lens barrel 14 while allowing it to rotate to advance or retract within the barrel mounting portion 18. Opposed guide pins 24 are formed on the barrel mounting portion 18 to extend into the opening 22. The guide pins 24 are formed to cooperate with helical slots 26 at one end of the projection lens barrel 14 to hold it onto the housing 12. The cooperation between the guide pins 24 and the helical slots 26 allows the projection lens barrel 14 to advance and retract along the focal axis 16 as the projections lens barrel 14 rotates to compensate the lens. Although the guide pins 24 are shown as being located at upper and lower positions on the barrel mounting portion 18 it is understood that the guide pins 24 could be located at opposed positions anywhere on the barrel mounting portion 18. Additionally, the guide pins 24 may not be integral with the barrel mounting portion 18 but may be separate elements that are later pressed into openings or otherwise connected to the barrel mounting portion 18. The guide pins 24 are referred to as "pins". However, this term is merely used to describe any kind of element that cooperates with the helical slots 26 to connect the projection lens barrel 14 to the housing 12.

Figure 4:
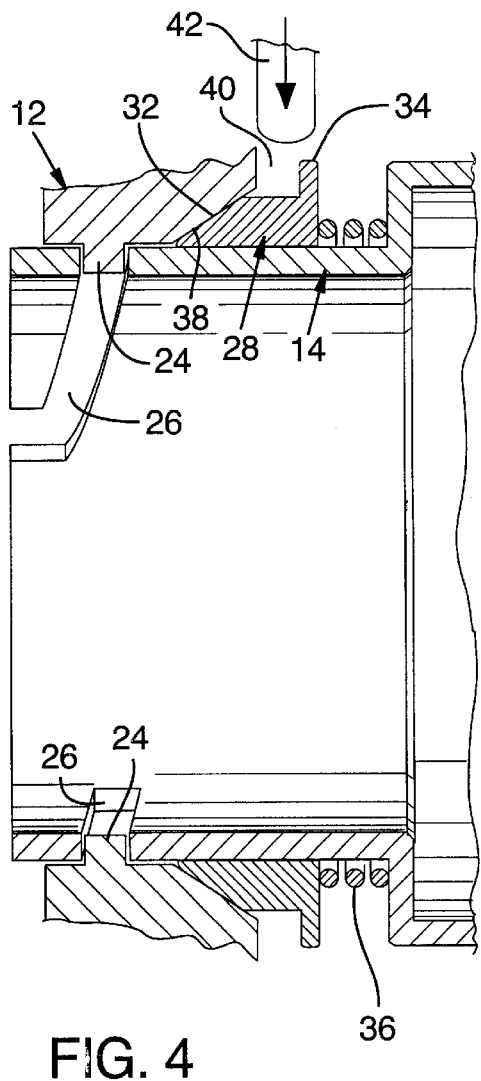
FIG. 4 is a partial sectional view along lines 4—4 in FIG. 3 showing the collet in a locked position.
Figure 5:
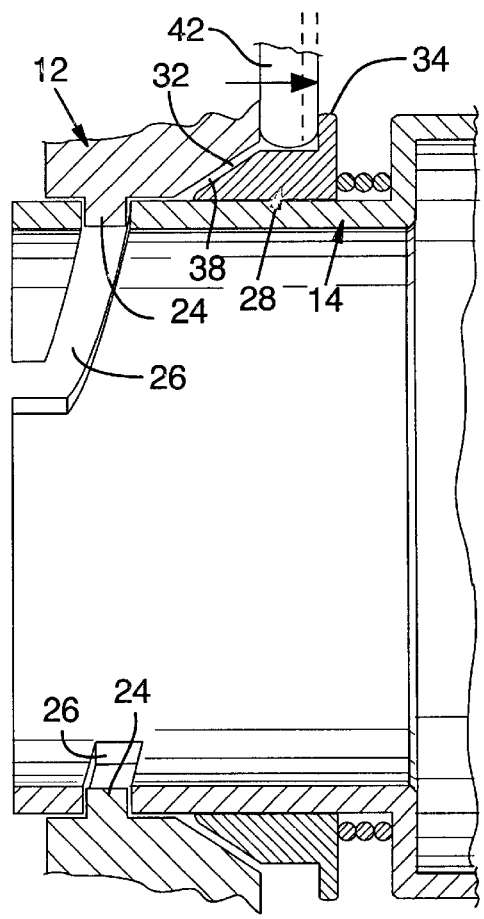
FIG. 5 is a partial sectional view similar to FIG. 4 showing the collet in a released position.

In order to hold the projection lens barrel 14 in the adjusted position a collet 28 is provided between the projection lens barrel 14 and the barrel mounting portion 18 of the housing 12. The collet 28 includes flexible sections 30 having a straight inner surface 31 that fits over the end of the projection lens barrel 14 and a conical outer surface 32. An outwardly extending flange 34 is formed at one end of the collet 28. The collet 28 is urged into engagement with the barrel mounting portion 18 of the housing 12 by a spring mechanism which could be any type of spring but is shown here as a coil spring 36 located between the collet 28 and the projection lens barrel 14. The coil spring 36 acts against the flange 34 of the collet 28 to urge it into engagement with the barrel mounting portion 18. In this locked position the conical outer surfaces 32 of the collet 28 frictionally engage an inwardly tapered surface 38 on the barrel mounting portion 18 to hold the projection lens barrel 14 in a selected position. The locked position of the collet 28 is seen in FIG. 4 in which the flange 34 is slightly spaced from the barrel mounting portion 18. The space 40 allows the collet 28 to be easily moved from the locked position of FIG. 4 to a released position best seen in FIG. 5 so that the projection lens barrel 14 can be rotated to be advanced or retracted within the barrel mounting portion 18 to the compensate the lens.

During manufacture of the image projector the projection lens is compensated by first rotating the zoom lens to a position in which the image is as large as possible. The large image is then focused by rotating the projection lens barrel to move the lens elements internally. The zoom lens is then rotated to an extreme opposite position in which the image is as small as possible and the small image is then focused by releasing the projection lens barrel 14 by moving the collet 28 against the action of the spring 36 to the position seen in FIG. 5. The collet 28 may moved in any convenient manner such as by inserting an adjustment tool 42 sized to fit within the space 40 between the flange 34 and the barrel mounting portion 18. Once the collet 28 no longer engages the barrel mounting portion 18 the projection lens barrel 14 is no longer frictionally held and can be rotated to advance or retract within the barrel mounting portion 18 to focus the projected image. When the projected image is focused the lens is compensated the collet 28 is released and the spring 36 then urges the collet 36 into the locked position to hold the lens barrel 14 in its adjusted position.

The terms and expressions which have been employed in the foregoing specification are used therein as terms of description and not of limitation, and there is no intention of, in the use of such terms and expressions, of excluding equivalents of the features shown and described or portions thereof, it being recognized that the scope of the invention is defined and limited only by the claims which follow.

It will be obvious to those having skill in the art that many changes may be made to the details of the above-described embodiment of this invention without departing from the underlying principles thereof. The scope of the present invention should, therefore, be determined only by the following claims.

What is claimed is:

1. A mounting arrangement for a projection lens barrel of an image projector, comprising:

an image projector having a housing for projecting an image from an image source onto a viewing screen through at least one lens housed within a projector lens barrel mounted to the housing, the housing having at least one guide member that cooperates with at least one guide slot in the projector lens barrel to advance and retract the projection lens barrel along an axis as the projection lens barrel is rotated; and a spring-actuated collect member located on the projection lens barrel for selective engagement with the housing to lock the projection lens barrel in a selected position.

2. The mounting arrangement of claim 1, wherein the at least one guide member comprises a guide pin formed integrally with the housing.

3. The mounting arrangement of claim 2, wherein the at least one guide slot is helical.

4. The mounting arrangement of claim 1, wherein housing has opposed guide members that cooperate with opposed guide slots in the projector lens barrel.

5. The mounting arrangement of claim 4, wherein the opposed guide slots are helical.

6. The mounting arrangement of claim 1, wherein the spring-actuated collect member is urged into engagement with the housing by a spring member located between the mounting portion of the housing and the projection lens barrel.

7. In a projection system that includes a housing for projection components and a projection lens barrel through which light travels to project an image along a focal axis onto a screen, a connection for the projections lens barrel comprising:

a mounting portion on the housing for supporting the projection lens barrel as it rotates to move along the focal axis to an adjusted position to focus the image; and a collet located between the projection lens barrel and the mounting portion movable by spring between a first position in which the collet frictionally engages the mounting portion to lock the projection lens barrel to the housing and a second position in which the collet is not engaged with the mounting portion so that the projection lens barrel is free to rotate to an adjusted position.

8. The connection of claim 7 further comprising a frictional surface formed on the mounting portion for engagement with the collet in the first position to hold the lens barrel in the first position.

9. The connection of claim 7 further comprising a flange on the collet spaced from the mounting portion when the collet is in the first position.

* * * * *

UNITED STATES PATENT AND TRADEMARK OFFICE
CERTIFICATE OF CORRECTION

PATENT NO. : 6,337,775 B1  
DATED : January 8, 2002  
INVENTOR(S) : Clark Wilson Page 1 of 1

It is certified that error appears in the above-identified patent and that said Letters Patent is hereby corrected as shown below:

Column 1,
Line 12, "scrcen" should read -- screen --.

Column 2,
Line 27, "may formed" should read -- may be formed --.
Line 44, "invention to" should read -- invention is to --.

Column 4,
Line 36, "collet 36" should read -- collet 28 --.
Line 41, "expressions, of excluding" should read -- expressions, excluding --.
Line 64, "collect" should read -- collet --.

Column 5,
Line 6, "wherein housing" should read -- wherein the housing --.
Line 13, "collect" should read -- collet --.

Signed and Sealed this

Eighteenth Day of February, 2003

JAMES E. ROGAN  
*Director of the United States Patent and Trademark Office*